Patented Aug. 19, 1941

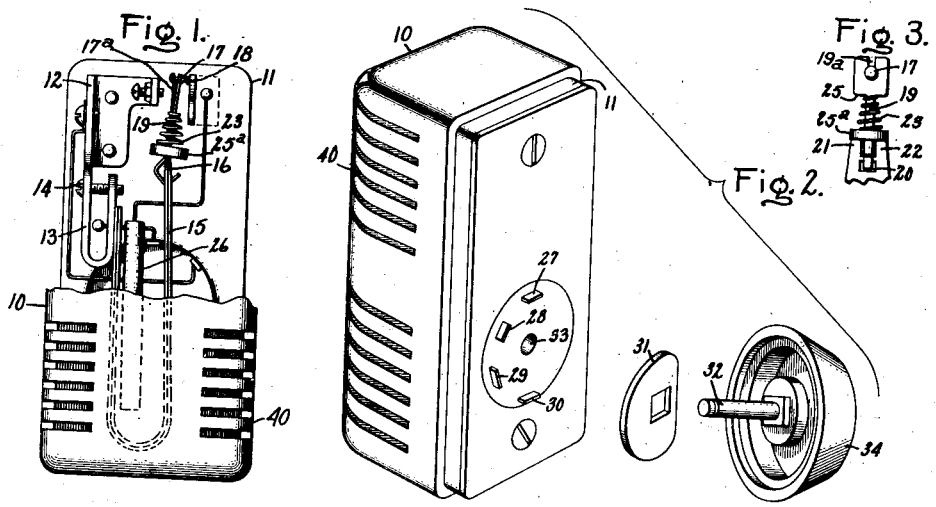

2,253,162

UNITED STATES PATENT OFFICE 2,253,162

REFRIGERATOR CONTROL SYSTEM

Edgar H. Ayers, Schenectady, N. Y., assignor to General Electric Company, a corporation of New York Application February 28, 1940, Serial No. 321,223

10 Claims. (Cl. 62—4)

My invention relates to refrigerator control systems, more particularly to control means for maintaining a predetermined air or other fluid temperature in the food or other cooled compartment of the refrigerator, and has for its object simple, reliable and inexpensive control means of this character.

More particularly, my invention has for its object a refrigerator compartment or box air temperature control system which, under normal thermal conditions in the refrigerator, anticipates changes in the temperature of the box air thereby to cause operation of the cooling means periodically even though the box air temperature may remain substantially unchanged and to the end that the box air temperature is held at a predetermined temperature within close limits.

In carrying out my invention in one form, I control the cooling mechanism for the refrigerator by means of temperature responsive means, such as a thermostat, which is mounted in the refrigerator compartment or box so as to be responsive to the box air temperature. I also provide electric heating means for the thermostat which heating means is controlled by the thermostat so as to be energized and heat the thermostat when the refrigerator cooling mechanism is idle and be deenergized to allow the thermostat to cool when the cooling mechanism is in operation. This heating means is arranged to heat the thermostat at a rate much faster than the temperature rise of the box air so as to anticipate the rise in temperature of the box air. Moreover, the thermostat starts and stops the cooling mechanism when the thermostat is at temperatures substantially higher than the box air temperature being maintained so that the thermostat cools rapidly in the box air thereby to anticipate the fall in box air temperature occasioned by the operation of the cooling mechanism.

For defrosting of the refrigerator, I provide control means for disabling the heating means for the temperature responsive element whereby the temperature responsive element is made responsive only to the box air temperature and whereby the box air and evaporator temperatures rise to a defrosting value before the cooling mechanism is started.

For quick freezing, I provide additional heating means for the temperature responsive element which may be made effective as desired and which heats the temperature responsive element at a faster rate thereby causing the cooling mechanism to remain in operation for a greater portion of time and maintain lower box air and evaporator temperatures.

For a more complete understanding of my invention, reference should be had to the accompanying drawing, Fig. 1 of which is a front elevation view with part of the cover cut away of a temperature responsive control device embodying my invention; Fig. 2 is an exploded view of the device of Fig. 1 showing the control knob and control contacts; Fig. 3 is a fragmentary view showing details of the contact snap mechanism; Fig. 4 is a wiring diagram of a refrigerator control system embodying one form of my invention; Fig. 5 is a diagrammatic representation of the position of the control contact device for various refrigerator operations; Fig. 6 is a fragmentary diagrammatic view showing a typical cooling mechanism and a control device mounted in a refrigerator cabinet; Fig. 7 is a wiring diagram showing a modified form of my invention; Fig. 8 is a wiring diagram showing another modified form of my invention; while Fig. 9 shows diagrammatically the various positions of the control contact device for the systems of Figs. 7 and 8.

Referring to the drawing, in one form of my invention I provide a temperature responsive control device 10 which is mounted in the refrigerator box or cooling compartment. This device comprises a base 11 made of electrically insulating material on which is a metal support 12 provided with a U-shaped portion 13 the end of which may be adjusted laterally by means of an adjustment screw 14. To this adjustable side is secured one end of a U-shaped bimetallic thermostat 15 constituting a temperature responsive element. The free end 16 of this thermostat which is movable in response to changes in the temperature of the thermostat carries an electrical contact 17 which is movable by the thermostat into engagement with a stationary electric contact 18.

In order to give the contact 17 a snap action, it is mounted on an arm 19, the lower end of which is hook-shaped and extends through an aperture 20 (Fig. 3) in the thermostat. Also the upper end of the thermostat is forked with projections 21 and 22 between which the contact arm 19 is movable about its lower end as a pivot. Snap action is obtained by a helical compression spring 23 having its upper end engaging a shoulder 25 on the upper end of the contact arm and its lower end seated in a shallow cup-like member 25a which, in turn, rests pivotally on the upper ends of the projections 21 and 22. The member 25a is provided with a central aperture, not shown, through which the contact arm 19 extends and which is large enough to provide a desired lateral movement of the contact arm. Also the lower turns of the spring 23 are enlarged to provide for this lateral movement of the contact arm. Thus, it will be observed that the spring 23 is an over-center compression spring and snaps the contact arm 19 from one position to another.

Preferably, as shown, the contact 17 is mounted on the end of a flexible spring arm 17a having its lower end secured to the arm 19. This arm flexes toward the left hand, as shown in Fig. 1, when the contact 17 engages the contact 18 to provide for a wiping action between the contacts. It will be understood that the contact 17 is mounted on the end of a stud which extends through a slot 19a in the upper end of the arm 19, the contact 17 seating against the arm 19 at each side of the slot when the contacts are in engagement.

Mounted in the device 10 adjacent the thermostat 15 so as to heat the thermostat, is an electric heating resistor or heating element 26, the resistor being suitably secured to the base 11. This heating resistor, in fact, consists of two resistors 26 and 26a, as shown in Fig. 4. To provide for the adjustment of the control mechanism to give desired cycles of operation, the electric connections with the mechanism mounted on the base 11 are brought out from the rear side of the base to contacts 27, 28, 29 and 30. Bearing against two or more of these contacts in dependence upon its position is a semi-circular, disk bridging member 31 mounted on a shaft 32 journaled in an aperture 33 in the base 11 and rotatable by means of a knob 34 to engage and connect together two or more of the contacts.

As shown in Fig. 4, the fixed end of the thermostat 15 is electrically connected to the contact 28. One end of the resistor 26 is connected to the contact 29 and one end of the resistor 26a to the contact 30. The opposite ends of the resistors 26 and 26a are connected together electrically and connected through a conductor to one supply main 35 connected to one side of a suitable electric supply source. Also the stationary contact 18 is connected to the supply main 35 and to the joined ends of the resistors 26 and 26a. The other electric supply main 36 may be connected through a normally open switch 37 to one side of a suitable electric motor 38, the other side of which is connected to the main 35. The switch 37 is operated to its closed position by means of a coil 39 having one end connected to the supply main 36 and its other end connected to the contact 27. It will be understood that the motor 38 drives suitable conventional refrigerator cooling mechanism which is shown diagrammatically in Fig. 6.

For normal operation of the refrigerator, the knob 34 is turned to bring the bridging member 31 to the "normal" position, shown in Fig. 5 in which the bridging member connects together the three contacts 27, 28 and 29. The resistor 26 only is then connected for energization. When the contact 17 is disengaged from the contact 18, the heater 26 is connected through the bridging contact 31 and the coil 39 directly across the supply mains 35 and 36. The current through the heater, however, is not great enough to cause the coil 39 to pick up its switch and, consequently, the switch 37 remains open.

The resistor 26, however, heats the thermostat in a short time to its operating temperature whereupon the thermostat snaps the contact 17 into engagement with the contact 18. This establishes a shunt circuit around the resistor, thus deenergizing or disabling it and reducing its rate of heat generation to a negligible value, whereupon the coil 39 closes the switch 37 and the motor 38 is started and the cooling mechanism operated to decrease the air temperature of the refrigerator food compartment. The thermostat then cools rapidly in the box air and when cooled to a predetermined temperature it separates the contacts 17 and 18 thus stopping the motor 38 and reenergizing the resistor 26. The cycle is then repeated.

One feature of my invention is the arrangement and proportioning of the heater 26 with respect to the thermostat so as to give the thermostat an anticipatory temperature control function whereby the thermostat starts and stops the cooling mechanism so as to anticipate temperature changes in each direction. I obtain this result by constructing and adjusting the thermostat to actuate the contact 17 at temperatures considerably above the normal temperature of the refrigerator box air, and by proportioning the heater 26 to heat the thermostat at a much faster rate than the rate of increase in the box air temperature and furthermore to heat the thermostat to its operating temperature even though the refrigerator box air temperature may be at the desired normal value. In a typical refrigerator equipped with my preferred invention, the desired normal refrigerator box temperature was 40 degrees F. while the thermostat 15 was arranged to move the contact 17 into engagement with the contact 18 when the thermostat was heated to a high operating temperature of 50 degrees F. and to separate the contacts when the thermostat cooled to a low operating temperature of 48 degrees F. The normal cycle after the temperature had reached normal and the conditions were stabilized was operation of the cooling mechanism for a period of about three minutes followed by an idle period of about ten minutes.

During the idle period, the resistor 26 heats the thermostat to its 50 degree operating temperature before the box air temperature has changed substantially. In fact, the heater generates sufficient heat to heat the thermostat to this temperature even though the box air temperature remains at the desired 40 degree F. temperature or a lower temperature. The time required to heat the thermostat, however, obviously varies inversely with the box air temperature.

When the thermostat starts the cooling mechanism, the thermostat is cooled rapidly because its temperature of 50 degrees is substantially above the temperature of the box air of 40 degrees F. or somewhat higher. By reason of this, the thermostat is cooled to its 48 degree temperature before the box air temperature has decreased substantially. Thus the thermostat anticipates the decrease in temperature.

By adjusting the screw 14, the thermostat can be adjusted to increase or decrease the temperature at which it operates and thereby correspondingly change the box air temperature that is maintained. By increasing the rate of heat generation by the resistor 26, the limits between which the box air temperature is maintained can be decreased, whereas a decrease in the rate of heat generation increases the limits of temperature variation. In the typical refrigerator referred to, the box air temperature is held between a low of 39 degrees F. and a high of 41 degrees F.

Of course, if the resistor 26 is changed as to its rate of heat generation, it will be necessary to adjust the thermostat by means of the screw 14 suitably to obtain the desired mean temperature that is to be maintained. In fact, when the rate of heat generation of the resistor 26 is increased, less time is required to heat the thermostat to its operating temperature and, consequently, the cooling mechanism operates for a greater proportion of the time and the box temperature is lowered. A decrease in the rate of heat generation of the resistor 26 has the opposite effect.

The casing 10 surrounding the thermostat and heater, as well as the contacts 17 and 18, is provided with ventilating apertures 40 to give substantially free access of the box air to the thermostat. However, the casing does give a small amount of heat muffling effect which increases the effectiveness of the heater in heating the thermostat but also decreases the rate at which the thermostat is cooled. The resistor is mounted in good thermal relation with the thermostat so that the resistor heats the thermostat without appreciably increasing the temperature of the box air. Preferably, however, the heater is spaced from the thermostat for the purpose of providing for rapid cooling of the thermostat when the heater is deenergized.

Fig. 6 shows somewhat diagrammatically a control device mounted in a refrigerator cabinet 41. The control device 10 is secured to a horizontal plate 42 extending across the front of the evaporator 43 mounted in the food compartment or box. This plate 42 is located at the top of the evaporator and has its ends suitably secured to the tops of evaporator sides. The box 10 is secured to the rear side of the plate 42, as seen in Fig. 6, with the adjustment knob 34 extending through a suitable aperture in the plate 42 so that the knob can be conveniently turned by grasping it with the hand. Preferably the device 10 is spaced somewhat from the top wall of the refrigerator compartment to provide for free circulation of the box air around the device 10. Also the device 10 is mounted midway between the side walls of the evaporator for a similar purpose.

I have found that the box air at this position of the control device is representative of the box air temperature and differs but slightly from the box air temperature in other upper regions of the box. This is a convenient position for the control device, particularly for the reason that the space that it occupies is not normally used. The device may, of course, be located in other positions in the box.

As shown in Fig. 6, the motor 38 and compressor driven by it are enclosed in a sealed casing 44. The compressor supplies liquid refrigerant to the evaporator or cooling element 43 through a suitable condenser 45 and a float chamber 46. The gaseous refrigerant is withdrawn from the evaporator to the compressor through a conduit 47.

In order to defrost the evaporator of the refrigerator with the system shown in Fig. 4, the bridging contact 31 is turned to the "defrost" position indicated in Fig. 5 in which position contacts 27 and 28 only are connected together and the resistor 26 as well as the resistor 26a is deenergized and thereby disabled continuously so that the thermostat is responsive only to the actual box air temperature. The box air temperature then rises to the value required to cause operation of the thermostat whose temperature will lag somewhat behind the box air temperature. As a result, the evaporator temperature rises to a value approximating the temperature of the box air and the evaporator is defrosted.

For quick freezing, the contact 31 is turned to the "freeze" position indicated in Fig. 5 whereby the contacts 27, 28, 29 and 30 are connected to each other electrically. This energizes the resistor 26a as well as the resistor 26 upon disengagement of the thermostat contacts 17 and 18. The relatively large amount of heat generated by the two resistors heats the thermostat very quickly to again start the cooling mechanism. As a result of this action, the cooling mechanism is caused to be in operation a larger proportion of the time, and the box air temperature therefore is maintained at a lower value with consequent lower evaporator temperature and quick freezing of food placed in the evaporator in the conventional manner. In the preferred installation previously referred to, the box air temperature varied during this quick freezing between limits of 33 degrees F. and 34 degrees F. Because of the box air temperature response of the control, the danger of a freezing box air temperature is obviated.

The system of Fig. 4 is turned off permanently by turning the contact 31 to the "off" position indicated in Fig. 5 in which the coil 39 and the motor cannot be energized.

It will be understood that the motor 38 will be a suitable motor having suitable starting means, not shown, for example, as described and claimed in U. S. Patent No. 1,996,599, issued April 2, 1935, to Louis W. Thompson.

In the modified form of my invention shown in Fig. 7, the heating resistors 48 and 48a for the thermostat 49 are connected across a neon lamp 50 for the purpose of eliminating to a great extent the effect of variations in the supply voltage on the refrigerator temperature. These variations in supply voltage are detrimental when the control contact 51 is in the "freeze" position. Thus with the system of Fig. 4 uncompensated for voltage changes, an increase in voltage of 20 per cent during freeze operation may so increase the amount of heat generated by the resistors as to reduce the box air temperature to below freezing and freeze food in the box.

The neon lamp 50, however, has a relatively constant voltage drop across its arc irrespective of variations in line voltage and, consequently, a correspondingly constant voltage is impressed on the resistors 48 and 48a.

In this system of Fig. 7, the contact arm carried by the thermostat is moved between two spaced stationary contacts 52 and 53. When the thermostat cools, it makes contact with the contact 53 and connects the neon lamp 50 across the supply mains in series with a neon lamp resistor 54, and one or both of the resistors 48 and 48a are connected in parallel with the lamp for the normal and freeze positions shown in Fig. 8 as the case may be. When the thermostat is heated to its operating temperature, it makes engagement with the contact 52 thereby deenergizing the resistors and energizing the relay coil 55 to start the motor 56.

In the system of Fig. 7, for defrost the contact 51 is turned into engagement with the stationary contact 57 only or in any other position in which it does not electrically connect the contact 57 with either one of the contacts 58 and 59. With this connection, a thermostat 49 is responsive only to box temperature as described in connection with Fig. 4 with the result that the evaporator temperature increases and the evaporator is thereby defrosted.

The system shown in Fig. 8 is very similar to the system of Fig. 6 with the exception that instead of a neon lamp, an auxiliary thermostat 60 is provided to compensate for voltage changes. This thermostat is heated by the heaters 61 and 61a when they are energized. It is connected when heated to a predetermined temperature to open the switch 62 and deenergize the resistor 61a. Thus the temperature of the heater 61a is limited and in case of an abnormally high voltage, can be heated only to that temperature. This limits the low value of the box air temperature during quick freezing when the resistor 61a is energized. A suitable condenser 63 is connected across the switch 62 to eliminate radio interference.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. A refrigerator system comprising walls forming a cooling compartment, cooling means for said compartment, electric control means for said cooling means, temperature responsive means mounted in said compartment and responsive to the temperature of the fluid in said compartment for operating said control means to start and stop said cooling means to maintain a predetermined fluid temperature in said compartment, said temperature responsive means operating to start and stop said cooling means when heated and cooled respectively to high and low operating temperatures each substantially higher than said predetermined fluid temperature, and electric heating means for heating said temperature responsive means to said high operating temperature, said control means including means for controlling said heating means by said temperature responsive means so as to energize said heating means to heat said temperature responsive means when said cooling means is stopped and to reduce the rate of heat generation of said heating means when said cooling means is in operation.

2. A refrigerator system comprising walls forming a cooling compartment, cooling means for said compartment, electric control means for said cooling means, temperature responsive means mounted in said compartment and responsive to the temperature of the fluid in said compartment for operating said control means to start and stop said cooling means to maintain a predetermined fluid temperature in said compartment, said temperature responsive means operating to start and stop said cooling means when heated and cooled respectively to high and low operating temperatures each substantially higher than said predetermined fluid temperature, and electric heating means for heating said temperature responsive means to said high operating temperature at a rate substantially greater than the rate of rise of said fluid temperature when said cooling means is stopped, said control means including means for controlling said heating means by said temperature responsive means so that said heating means is energized to heat said temperature responsive means when said cooling means is stopped and deenergized for cooling of said temperature responsive means when said cooling means is in operation, said temperature responsive means being cooled when said cooling means is in operation at a rate substantially greater than the rate of decrease of said fluid temperature, whereby said temperature responsive means operates to anticipate changes in said fluid temperature in each direction.

3. A refrigerator system comprising walls forming a cooling compartment, cooling means for said compartment, electric control means for said cooling means, temperature responsive means mounted in said compartment and responsive to the temperature in said compartment for operating said control means to start and stop said cooling means to maintain a predetermined temperature in said compartment, said temperature responsive means operating to start and stop said cooling means when heated and cooled respectively to high and low temperatures each substantially higher than said predetermined air temperature, electric heating means for heating said temperature responsive means to said high operating temperature, said control means including means for controlling said heating means by said temperature responsive means so that said heating means is energized to heat said temperature responsive means to said high temperature when said cooling means is stopped and deenergized to provide for cooling of said temperature responsive means to said low temperature when said cooling means is in operation, and switching means for varying the rate of heat generation of said heating means thereby to vary the temperature maintained in said compartment.

4. A refrigerator system comprising walls forming a cooling compartment, cooling means for said compartment, electric control means for said cooling means, temperature responsive means mounted in said compartment and responsive to the temperature in said compartment for operating said control means to start and stop said cooling means to maintain a predetermined temperature in said compartment, said temperature responsive means operating to start and stop said cooling means when heated and cooled respectively to high and low temperatures each substantially higher than said predetermined air temperature, electric heating means for heating said temperature responsive means to said operating temperature, said control means including means for controlling said heating means by said temperature responsive means so that said heating means is energized to heat said temperature responsive means to said high temperature when said cooling means is stopped and deenergized when said cooling means is in operation to provide for cooling of said temperature responsive means to said low temperature, and switching means for disabling said heating means for defrosting of said cooling means.

5. A refrigerator system comprising walls forming a cooling compartment, cooling means for said compartment, electric control means for said cooling means, temperature responsive means mounted in said compartment and responsive to the temperature in said compartment for operating said control means to start and stop said cooling means to maintain a predetermined temperature in said compartment, said temperature responsive means operating to start and stop said cooling means when heated and cooled respectively to high and low temperature each substantially higher than said predetermined temperature, electric heating means for heating said temperature responsive means to said operating temperature, said control means including means for controlling said heating means by said temperature responsive means so that said heating means is energized to heat said temperature responsive means when said cooling means is stopped and deenergized when said cooling means is in operation to provide for cooling of said temperature responsive means to said low temperature, a second electric heating means, and selective switching means movable to one position to disable said second heating means and to another position to connect said second heating means for energization concurrently with said first heating means for quick freezing.

6. A refrigerator system comprising walls forming a cooling compartment, cooling means for said compartment, electric control means for said cooling means, temperature responsive means mounted in said compartment and responsive to the temperature in said compartment for operating said control means to start and stop said cooling means to maintain a predetermined temperature in said compartment, said temperature responsive means operating to start and stop said cooling means when heated and cooled respectively to high and low temperatures each substantially higher than said predetermined temperature, electric heating means for heating said temperature responsive means to said operating temperature, said control means including means for controlling said heating means by said temperature responsive means so that said heating means is energized to heat said temperature responsive means when said cooling means is stopped and deenergized when said cooling means is in operation to provide for cooling of said temperature responsive means to said low temperature, a second electric heating means, and selective switching means for disabling said first heating means for defrosting of said cooling means and for connecting said second heating means for energization concurrently with said first heating means for quick freezing by said cooling means.

7. A refrigerator system comprising walls forming a cooling compartment, cooling means for said compartment, electric control means for said cooling means, temperature responsive means mounted in said compartment and responsive to the temperature in said compartment for operating said control means to start and stop said cooling means to maintain a predetermined temperature in said compartment, said temperature responsive means operating to start and stop said cooling means when heated and cooled respectively to high and low temperatures each substantially higher than said predetermined temperature, electric heating means for heating said temperature responsive means to said operating temperature, said control means including means for controlling said heating means by said temperature responsive means so that said heating means is energized to heat said temperature responsive means when said cooling means is stopped and deenergized when said cooling means is in operation to provide for cooling of said temperature responsive means to said low temperature, and means having a substantially constant voltage drop irrespective of the voltage supplied to it connected across said heating resistor to maintain thereby the rate of heat generation of said heater substantially constant regardless of changes in the voltage applied to said heating means.

8. A refrigerator system comprising walls forming a cooling compartment, cooling means for said compartment, electric control means for said cooling means, temperature responsive means mounted in said compartment and responsive to the temperature in said compartment for operating said control means to start and stop said cooling means to maintain a predetermined temperature in said compartment, said temperature responsive means operating to start and stop said cooling means when heated and cooled respectively to high and low temperatures substantially higher than said predetermined air temperature, electric heating means for heating said temperature responsive means to said operating temperature, said control means including means for controlling said heating means by said temperature responsive means so that said heating means is energized to heat said temperature responsive means when said cooling means is stopped and deenergized to provide for cooling of said temperature responsive means when said cooling means is in operation, and means responsive to the temperature of said heater for controlling a circuit of said heater to limit the temperature of said heater to a predetermined value.

9. A refrigerator system comprising walls forming a cooling compartment, cooling means for said compartment for cooling a fluid contained in said compartment to a predetermined desired temperature to be maintained, temperature responsive means mounted so as to be cooled by said fluid, heating means for heating said temperature responsive means to a high operating temperature substantially higher than said predetermined temperature, control means operated by said temperature responsive means when said temperature responsive means is heated to said high operating temperature to start operation of said cooling means and to disable said heating means to provide for cooling of said temperature responsive means by said fluid, said control means being operated by said temperature responsive means when said temperature responsive means is cooled to a low operating temperature substantially higher than said predetermined temperature to stop operation of said cooling means and start operation of said heating means.

10. A refrigerator system comprising walls forming a cooling compartment, cooling means for said compartment for cooling a fluid contained in said compartment to a predetermined temperature to be maintained, temperature responsive means immersed in said fluid so as to be cooled thereby, electric heating means for heating said temperature responsive means to a high operating temperature higher than said predetermined temperature even though the temperature of said fluid is at said predetermined temperature, control means operated by said temperature responsive means when said temperature responsive means is heated to said high operating temperature to start operation of said cooling means even though the temperature of said fluid is substantially at said predetermined temperature and to deenergize said heating means to provide for cooling of said temperature responsive means by said fluid, said control means being operated by said temperature responsive means when said temperature responsive means is cooled to a low operating temperature substantially higher than said predetermined temperature to stop operation of said cooling means and reenergize said heating means even though the temperature of said fluid remains substantially at said predetermined temperature.

EDGAR H. AYERS.